United States Patent
Wang et al.

(10) Patent No.: US 8,688,113 B2
(45) Date of Patent: Apr. 1, 2014

(54) METHOD AND SYSTEM FOR IMPLEMENTING LOCATION SERVICE

(75) Inventors: Guocai Wang, Shenzhen (CN); Haojun Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 60 days.

(21) Appl. No.: 13/258,110

(22) PCT Filed: Mar. 25, 2010

(86) PCT No.: PCT/CN2010/071308
§ 371 (c)(1), (2), (4) Date: Oct. 17, 2011

(87) PCT Pub. No.: WO2010/133104
PCT Pub. Date: Nov. 25, 2010

(65) Prior Publication Data
US 2012/0058779 A1 Mar. 8, 2012

(30) Foreign Application Priority Data
May 21, 2009 (CN) .......................... 2009 1 0142999

(51) Int. Cl.
H04W 4/00 (2009.01)
(52) U.S. Cl.
USPC .............. 455/435.1; 455/433; 455/432.2; 455/456.1; 455/456.3; 455/456.5
(58) Field of Classification Search
USPC ............. 455/435.1, 433, 432.2, 456.1, 456.3, 455/456.5, 452.2
See application file for complete search history.

(56) References Cited

U.S. PATENT DOCUMENTS

2004/0185847 A1* 9/2004 Hamalainen et al. .......... 455/433
2007/0190985 A1* 8/2007 Bai et al. .................... 455/414.1
(Continued)

FOREIGN PATENT DOCUMENTS

| CN | 1491060 A | 4/2004 |
| CN | 101291450 A | 10/2008 |
| CN | 101394617 A | 3/2009 |
| CN | 101568067 A | 10/2009 |

OTHER PUBLICATIONS

International Search Report in international application number: PCT/CN2010/071308, mailed on Jul. 1, 2010.

(Continued)

*Primary Examiner* — Khai M Nguyen
(74) *Attorney, Agent, or Firm* — Oppedahl Patent Law Firm LLC (57) ABSTRACT

The present invention discloses a method and a system for implementing location service, in which the method comprises: sending a location request message from a source user to a MMSG by a MMSC; sending the location request message to a multimedia message generating platform by the MMSG; initiating a location request to an LSP by the multimedia message generating platform according to the location request message; performing location according to the initiated location request and returning a location result to the multimedia message generating platform by the LSP; generating multimedia message information according to the location result and sending the multimedia message information to the MMSG by the multimedia message generating platform; and sending the received multimedia message information to the source user through the MMSC by the MMSG. The present invention can not only reduce the requirement of the location service on terminal capability, but also more conveniently develop the location service, thereby realizing the aim of providing convenient and efficient location service to users by using multimedia message information.

8 Claims, 4 Drawing Sheets

(56) References Cited

U.S. PATENT DOCUMENTS

2008/0014971 A1    1/2008  Morin et al.
2008/0248820 A1*  10/2008  Lohtia ........................... 455/466
2013/0124657 A1*   5/2013  Bai et al. ....................... 709/206

OTHER PUBLICATIONS

English Translation of the Written Opinion of the International Search Authority in international application No. PCT/CN2010/071308, mailed on Jul. 1, 2010.

* cited by examiner

METHOD AND SYSTEM FOR IMPLEMENTING LOCATION SERVICE

TECHNICAL FIELD

The present invention relates to the field of communications, and particularly to a method and a system for implementing the location service.

BACKGROUND

At present, Multimedia Messaging Service (MMS) has been widely used. With this service, a Service Provider (SP) can provide timely and efficient information services rich in content (e.g. various multimedia message functions) for different terminal users (e.g. a mobile phone user) to effectively improve user experience in the services.

In various MMSs, the Location Service Platform (LSP), compared with the MMS, is not widely used and hindered in development due to limited user right, different terminal capabilities and inconvenient network access. At present, the location service is mainly developed in the following forms: (1) a user accesses a Web portal providing the location service through a Personal Computer (PC) terminal; (2) a user accesses a Web portal providing the location service through a mobile phone over Internet; (3) a user acquires the location service through a third party software embedded or additionally installed in a mobile phone; and (4) a user acquires the location service through a short message.

However, in form (1), a user must have a PC terminal, but it is not portable, resulting in lack of flexibility and convenience; in form (2), a user needs to log in a Web page through a mobile phone, which is complex in operation, difficult in configuration in the mobile phone, and higher at cost; in form (3), software needs to be installed or embedded in a terminal, which is difficult to realize for those not familiar with a mobile phone and requires higher terminal capability; and in form (4), since a short message can only provide position description in text format rather than detailed position information in image format, the information provided is not intuitionistic enough, thus affecting the user experience.

At present, there is no effective solution proposed to solve the problem that the location service in the related art is unable to be developed normally due to the limit in terminal capability, terminal portability, information provision and so on.

SUMMARY

The present invention is proposed in view of the location service in the related art unable to be developed normally due to the limit in terminal capability, terminal portability, information provision and so on, and the main objective of the present invention is to provide a solution for implementing location service in order to at least solve the problems above.

According to one aspect, the present invention provides a method for implementing location service, which comprises: sending a location request message from a source user to a Multimedia Messaging Service Gateway (MMSG) by a Multimedia Messaging Service Center (MMSC); sending the location request message to a multimedia message generating platform by the MMSG; initiating a location request to an LSP by the multimedia message generating platform according to the location request message; performing location according to the initiated location request and returning a location result to the multimedia message generating platform by the LSP; generating multimedia message information according to the location result and sending the multimedia message information to the MMSG by the multimedia message generating platform; and sending the received multimedia message information to the source user through the MMSC by the MMSG.

The location request message may comprise: an identifier of the multimedia message generating platform, a position service identifier, an identifier of the source user, and an identifier of a target user which the source user requests to locate.

Furthermore, the step of sending the location request message to the multimedia message generating platform by the MMSG may comprise: sending the location request message to a Data Service Management Platform (DSMP) by the MMSG; processing the identifier of the source user and/or the identifier of the target user according to a predetermined processing and returning a processed identifier of the source user and/or a processed identifier of the target user to the MMSG by the DSMP; and sending the position service identifier and the processed identifier of the source user and/or the processed identifier of the target user to the multimedia message generating platform by the MMSG according to an identifier of the multimedia message generating platform.

Furthermore, the step of sending the multimedia message information to the source user through the MMSC by the MMSG may comprise: sending the multimedia message information to the DSMP by the MMSG; determining the identifier of the source user according to the processed identifier of the source user, replacing the processed identifier of the source user in the multimedia message information with the determined identifier of the source user by the DSMP, and sending the replaced multimedia message information to the MMSC; and sending the replaced multimedia message information to the source user by the MMSC according to the identifier of the source user in the replaced multimedia message information.

Furthermore, the step of performing location by the LSP according to the initiated location request may comprise: inquiring the identifier of the source user and/or the identifier of the target user of the DSMP by the LSP according to the processed identifier of the source user and/or the processed identifier of the target user; determining a service type of the location service by the LSP according to the position service identifier; and locating the target user or locating both the source user and the target user by the LSP according to the inquired identifier of the source user, the inquired identifier of the target user and the determined service type, thereby obtaining location information.

Furthermore, the step of inquiring the identifier of the source user and the identifier of the target user of the DSMP by the LSP according to the processed identifier of the source user and the processed identifier of target user may comprise: providing the identifier of the source user and the identifier of the target user by the DSMP according to an inverse transformation of the predetermined processing.

Furthermore, the step of sending the location result to the multimedia message generating platform by the LSP may comprise: sending the location result which consists of the location information, the processed identifier of the source user and/or the processed identifier of the target user to the multimedia message generating platform by the LSP.

Furthermore, the step of generating the multimedia message information according to the location result and sending the multimedia message information to the MMSG by the multimedia message generating platform may comprise: generating the multimedia message information according to the location information in the location result, and sending the processed identifier of the source user and/or the processed identifier of the target user to the MMSG through the generated multimedia message information by the multimedia message generating platform.

According to another aspect, the present invention provides a system for implementing location service, which comprises: a MMSC, a MMSG, a multimedia message generating platform and an LSP; wherein the MMSC is used for sending a location request message from a source user to the MMSG and sending multimedia message information from the MMSG to the source user; the MMSG is used for sending the location request message from the MMSC to the multimedia message generating platform and sending the multimedia message information from the multimedia message generating platform to the MMSC; the multimedia message generating platform is used for initiating a location request to the LSP according to the location request message, generating the multimedia message information according to a location result from the LSP and sending the generated multimedia message information to the MMSG; and the LSP is used for performing location according to the location request initiated by the multimedia message generating platform and returning the location result to the multimedia message generating platform.

The location request message may comprise: an identifier of the multimedia message generating platform, a position service identifier, an identifier of the source user, and an identifier of a target user which the source user requests to locate; and the system may further comprise: a DSMP, used for receiving the location request message from the MMSG, processing the identifier of the source user and/or the identifier of the target user according to a predetermined processing, and sending the position service identifier, the processed identifier of the source user and/or the processed identifier of the target user to the multimedia message generating platform according to the identifier of the multimedia message generating platform through the MMSG.

with the technical solution of the present invention, the location service is realized in a way similar to the MMS by using the realizing mechanism of the MMS, merging the location system in the multimedia messaging system and modifying some interface messages and functions of system nodes, so as to not only reduce the requirement of the location service on terminal capability, but also more conveniently develop the location service, thereby realizing the aim of providing the convenient and efficient location service to users by using multimedia message information, avoiding the problem of failing to develop the location service due to various limits in the related art, and improving the user experience.

BRIEF DESCRIPTION OF THE DRAWINGS

The drawings herein are used for providing a further understanding of the present invention and constituting one part of this application, and the schematic embodiments of the present invention and description thereof are used for the explanation of the present invention and not limiting the present invention. In the drawings.

DETAILED DESCRIPTION

In view of the location service in the related art unable to be developed normally due to the limit in terminal capability, terminal portability, information provision and so on, the present invention implements the location service by using a mechanism for realizing the MMS (preferably, a mechanism for realizing an on-demand flow in the MMS), merging a location system in the MMS and modifying some interface messages and functions of system nodes, so as to not only reduce the requirement of the location service on terminal capability, but also more conveniently develop the location service, thereby achieving the aim of providing the convenient and efficient location service to a user by using multimedia message information.

In the location service, an SP is used by a location server as a session portal providing the location service, and in the MMS, the SP is also an important part in the whole system, so both can be merged together very well. Therefore, the present invention mainly uses the SP as a multimedia message generating platform. In a multimedia messaging system, in view of the service pressure of a Multimedia Messaging Service Center (MMSC), the timeliness requirement of the location service, and the load pressure of the network in the process of service realization, the present invention mainly uses a Multimedia Messaging Service Gateway (MMSG) as a platform to provide the location service. Therefore, it can be understood as that the MMSG is a device dedicated for providing SP service to a user, on which the description of the present invention is based, however, the MMSC can also provide the corresponding function that the MMSG provides and can be used as the device dedicated for providing SP service to a user if necessary only by modifying message interaction and a related interface.

The technical solution of the present invention is explained below with reference to the drawings in detail.

According to one embodiment of the present invention, a system for implementing the location service is provided.

Figure 1:
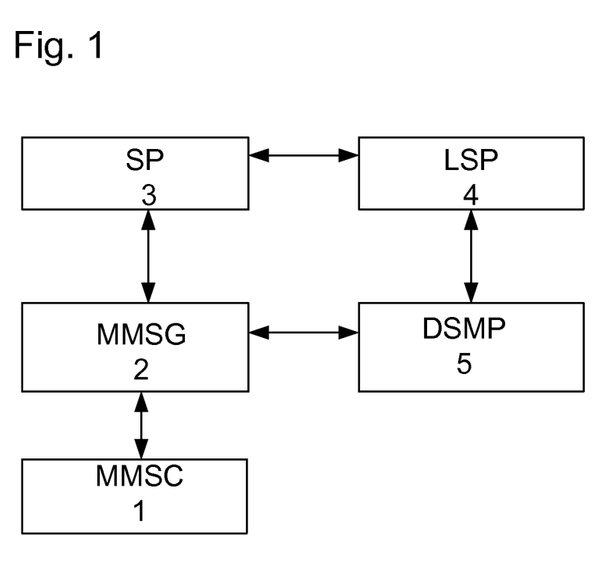
FIG. 1 is a block diagram illustrating the system for implementing the location service according to one embedment of the present invention.

FIG. 1 is a block diagram illustrating the system for implementing the location service according to one embedment of the present invention.

As shown in FIG. 1, the system comprises: a MMSC 1, a MMSG 2, an SP 3, and a Location Service Platform (LSP) 4, preferably, further comprises: a Data Service Management Platform (DSMP) 5.

The SP 3 is an whole-network service SP providing the location service and having a unique identifier, for example, an SP service code.

The necessary modifications to the net elements mentioned above and the functions of each net element for implementing the location service in the system shown in FIG. 1 are described below in detail.

The MMSC 1 is used for sending a location request message from a source user to the MMSG 2 and sending multimedia message information from the MMSG 2 to the source user. When using the location service in the system shown in FIG. 1, the user needs to know the service code of the SP providing the location service in advance and provide a position service identifier of the required location service. When requesting the service, the user can edit multimedia message information with a target address in a format of "SP service code+position service identifier+mobile phone number of a user to be located" and sends the information to the MMSC 1 to use the location service. Here, the MMSC 1 needs to be configured to, after receiving the location request message submitted by the user, forward the message to the MMSG 2 only when the service code in the message is determined to be qualified, so as to avoid that the MMSC 1 rejects the location service request message, this can be realized at a configuration station.

The MMSG 2 is used for sending the location request message from the MMSC to the SP 3 and sending multimedia message information from the SP 3 to the MMSC 1. Specifically, the MMSG 2 needs to be configured to be able to process the position service identifier and mobile phone number of the user to be located which are added in the location service request message as well as the source user number, and be able to decode an authentication response message (AuthPrice.RES), in which a Recipient Address (an address identifier of the SP) Field is added, returned by the DSMP 5. Moreover, the interaction messages between the MMSG 2 and SP 3 need to be modified, and the mobile phone number transmitted between the MMSG 2 and SP 3 is an encrypted number, i.e. a pseudo-code.

The SP 3 is used for initiating a location request to the LSP 4 according to the location request message, generating the multimedia message information according to a location result from the LSP 4 and sending the generated multimedia message information to the MMSG 2. Moreover, each interface message processing module between the SP 3 and the MMSG 2 or between the SP 3 and the LSP 4 needs to be modified to support the encrypted terminal number (pseudo-code).

The LSP 4 is used for performing location according to the location request initiated by the SP 3 and returning the location result to the SP 3. The interface processing module between the LSP 4 and the SP 3 or between the LSP 4 and the DSMP 5 needs to be modified also.

The location request message can comprise: the identifier of the SP 3 (also called the SP service code), the position service identifier (also called the position service identifier of the location service) and an identifier of a target user which the source user requests to locate (may be the number of the terminal).

To ensure the security of data transmission in the network, the system may further comprise the DSMP 5. During the process of realizing the location service, the LSP 4 or the MMSG 2 can interact with the DSMP 5 to encrypt and decrypt the transmitted information.

Specifically, the DSMP 5 needs to be configured that: when receiving an authentication request message (AuthPrice.REQ) from the MMSG 2, and if the target address in the message is in a format of "SP service code+position service identifier+mobile phone number of a user to be located", the DSMP 5 allows the access of the message and be capable of identifying that the message is a location request message which needs to be further processed; moreover, the number of the source user and the number of the user to be located need to be added in the authentication response message (AuthPrice.RES) returned by the DSMP 5 to the MMSG 2; in addition, in consideration of privacy, when returning the authentication response message to the MMSG 2, the DSMP 5 encrypts the number of the source user and/or the number of the user to be located according to user requirement or predetermined processing, replaces the number of the source user and the number of the user to be located in the authentication response message with the pseudo-codes obtained after the encryption and then sends the message to the MMSG 2. The encryption algorithm for converting a number to a pseudo-code is determined by the DSMP 5, so, during the process, each related system node will interact with the DSMP 5 for many times to let the DSMP 5 provide the conversion (replacement) between an original number and a pseudo-code.

Specifically, before sending the location request message to the SP 3, the MMSG 2 may send the location request message (corresponding to the authentication request message (AuthPrice.REQ)) to the DSMP 5; then, the DSMP 5 encrypts the identifier of the source user (may be the number of the terminal) and the number of the target user which is included in the location request message according to the predetermined encryption algorithm, and returns an encryption result to the MMSG 2 (the returned encryption result may be corresponding to the authentication response message (AuthPrice.RES)); then, the MMSG 2 may send the position service identifier, the encrypted number of the source user and the encrypted number of the target user to the SP 3 according to the identifier of the SP 3.

And then, when initiating the location request to the LSP 4 according to the location request message, the SP 3 sends the position service identifier and the encrypted number of the source user and the encrypted number of the target user to the LSP 4.

Before performing location according to the initiated location request, the LSP 4 inquires the number of the source user and the number of the target user of the DSMP 5 according to the encrypted number of the source user and the encrypted number of the target user. The DSMP 5 provides the number of the source user and the number of the target user according to the inverse transformation of the predetermined processing. The LSP 4 determines the service type of the location service according to the position service identifier, and then locates the target user or locates both the source user and target user according to the inquired number of the source user, the inquired number of the target user and the determined service type, thereby obtaining location information.

In case that the service type is used to locate both the source user and target user, the location information obtained by the LSP 4 comprises the position information of both the source user and target user, and, preferably, comprises route information between the source user and the target user. In case that the service type is used to locate the target user only, the location information obtained by the LSP 4 comprises the position information of the target user. Optionally, as informed in a form of a multimedia message, the obtained location information may be indicated with a map, besides, with corresponding text description and explanation if necessary.

Moreover, the position service identifier may be assigned with different values to identify different service types. For example, different values may show that the location information required by a user is plain text, or text+map, and the map only shows the position of the located user, or text+map, and the map shows the positions of both the source user and the located user to facilitate route selection.

After that, the LSP 4 sends the location result to the SP 3, wherein the location result consists of the location information, the encrypted number of the source user and the encrypted number of the target user.

Then, the SP 3 can generate multimedia message information according to the location result and send the multimedia message information to the MMSG 2. Specifically, the SP 3 can generate the multimedia message information according to the location information in the location result and send the encrypted number of the source user and the encrypted number of target user to the MMSG through the generated multimedia message information.

Next, before sending the multimedia message information to the source user through the MMSC 1, the MMSG 2 may send the multimedia message information to the DSMP 5, the DSMP 5 determines the number of the source user according to the encrypted number of the source user carried in the multimedia message information, and replaces the encrypted number of the source user in the multimedia message information with the determined number of the source user. The MMSG 2 sends the replaced multimedia message information to the MMSC 1; and the MMSC 1 sends the replaced multimedia message information to the source user according to the number of the source user in the replaced multimedia message information.

The MMSC 1 may be used, after the MMSG 2 sends the multimedia message information to the source user through itself, for sending a sending result of the multimedia message information to the MMSG 2; and the MMSG 2 may be used for generating a delivery report according the sending result and sending the delivery report to the SP 3, so that the SP 3 can charge the source user based on the delivery report.

Preferably, the predetermined encryption algorithm used by the DSMP 5 when executing the encryption may be a predetermined or notified algorithm in the system, for example, MD5 encryption algorithm which is used often.

The mechanism and system for implementing the MMS have been accepted by numerous users, so, by the aid of the system for implementing the MMS, the operation during the implementation of the location service may be more convenient, the configuration of a terminal is simpler with less capability requirement only by provisioning the GPRS, thereby facilitating the extension of the location service and realizing the aim of developing the location service anytime and anywhere.

The specific flow of implementing the location service based on the system is described below.

According to one embodiment of the present invention, a method for implementing the location service is further provided. In the method, the flow of implementing the location service is similar to that of multimedia message on-demand.

Figure 2:
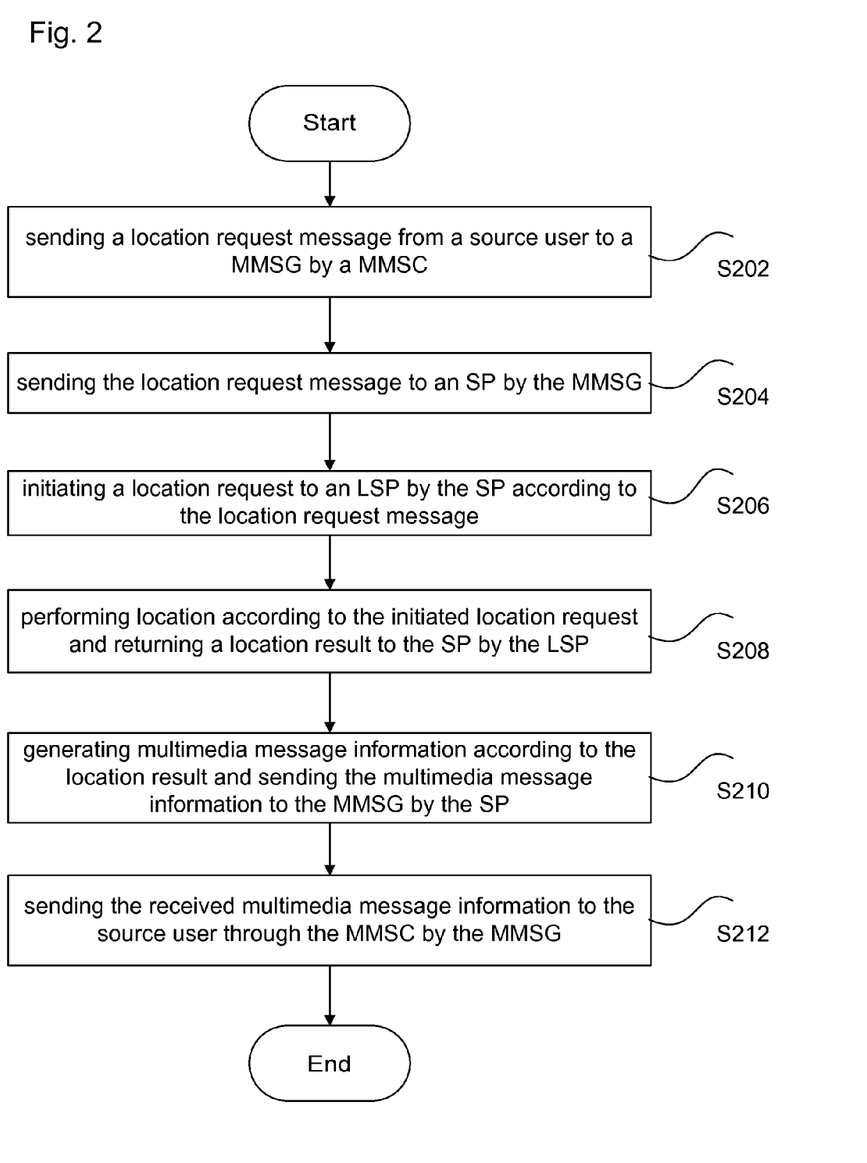
FIG. 2 is a flowchart illustrating the method for implementing the location service according to one embedment of the present invention.

FIG. 2 is a flowchart illustrating the method for implementing the location service according to one embedment of the present invention. It should be mentioned that the steps below can be, for example, executed in a computer system which includes a group of computer executable instructions. Moreover, FIG. 2 illustrates a logic sequence, but the steps shown or described may be executed in a different sequence in some cases.

As shown in FIG. 2, the method for implementing the location service according to one embodiment of the present invention comprises the following steps:

step 202: sending a location request message from a source user to a MMSG by a MMSC;

step 204: sending the location request message to an SP by the MMSG;

step 206: initiating a location request to an LSP by the SP according to the location request message;

step 208: performing location according to the initiated location request and returning a location result to the SP by the LSP;

step 210: generating multimedia message information according to the location result and sending the multimedia message information to the MMSG by the SP; and step 212: sending the received multimedia message information to the source user through the MMSC by the MMSG.

The location request message comprises at least one of: an identifier of the SP, an position service identifier and a number of a target user which the source user requests to locate.

In step 204, the step of sending the location request message to the SP by the MMSG specifically comprises: the MMSG sends the location request message to a DSMP (the MMSG may send the location request message to the DSMP by an authentication request message during the authentication of the request); the DSMP encrypts the number of the source user and the number of the target user which is included in the location request message according to a predetermined encryption algorithm and returns an encryption result to the MMSG (the DSMP may return the encryption result to the MMSG by an authentication response message); the MMSG sends the position service identifier, the encrypted number of the source user and the encrypted number of the target user to the SP according to the identifier of the SP.

In step 206, the step of initiating the location request to the LSP by the SP according to the location request message may specifically comprise: sending the position service identifier, the encrypted number of the source user and the encrypted number of the target user to the LSP by the SP.

In step 208, the step of performing location according to the initiated location request by the LSP may specifically comprise: the LSP inquires the number of the source user and the number of the target user of the DSMP according to the encrypted number of the source user and the encrypted number of the target user; the LSP determines the service type of the location service according to the position service identifier, and locates the target user or locates both the source user and the target user according to the inquired number of the source user, the inquired number of the target user and the determined service type, thereby obtaining location information. In case that the service type is used to locate both the source user and target user, the location information obtained by the LSP comprises the position information of both the source user and the target user. In case that the service type is used to locate the target user only, the location information obtained by the LSP comprises the position information of the target user.

After that, in step 208, the step of sending the location result to the SP by the LSP specifically comprises: sending the location result which consists of the location information, the encrypted number of the source user and the encrypted number of the target user to the SP by the LSP.

Then, in step 210, the step of generating multimedia message information according to the location result and sending the multimedia message information to the MMSG by the SP may specifically comprise: the SP generates the multimedia message information according to the location information in the location result and sends the encrypted number of the source user and the encrypted number of the target user to the MMSG through the generated multimedia message information.

Next, before sending the multimedia message information to the source user through the MMSC, the MMSG may send the multimedia message information to the DSMP, the DSMP determines the number of the source user according to the encrypted number of the source user, replaces the encrypted number of the source user in the multimedia message information with the determined number of the source user, and sends the replaced multimedia message information to the MMSC; and the MMSC sends the replaced multimedia message information to the source user according to the number of the source user in the replaced multimedia message information.

After finishing the sending of the multimedia message information, the MMSC may send a sending result of the multimedia message information to the MMSG; and the MMSG generates a delivery report according the sending result and sends the delivery report to the SP, so that the SP 3 can perform count and charge.

The MMS has been accepted by numerous users, so, by the aid of the method for implementing the MMS, the operation during the implementation of the location service may be more convenient, and the configuration of a terminal is simpler with less capability requirement only by provisioning the GPRS, thereby facilitating the extension of the location service and improving the user experience.

Figure 3:
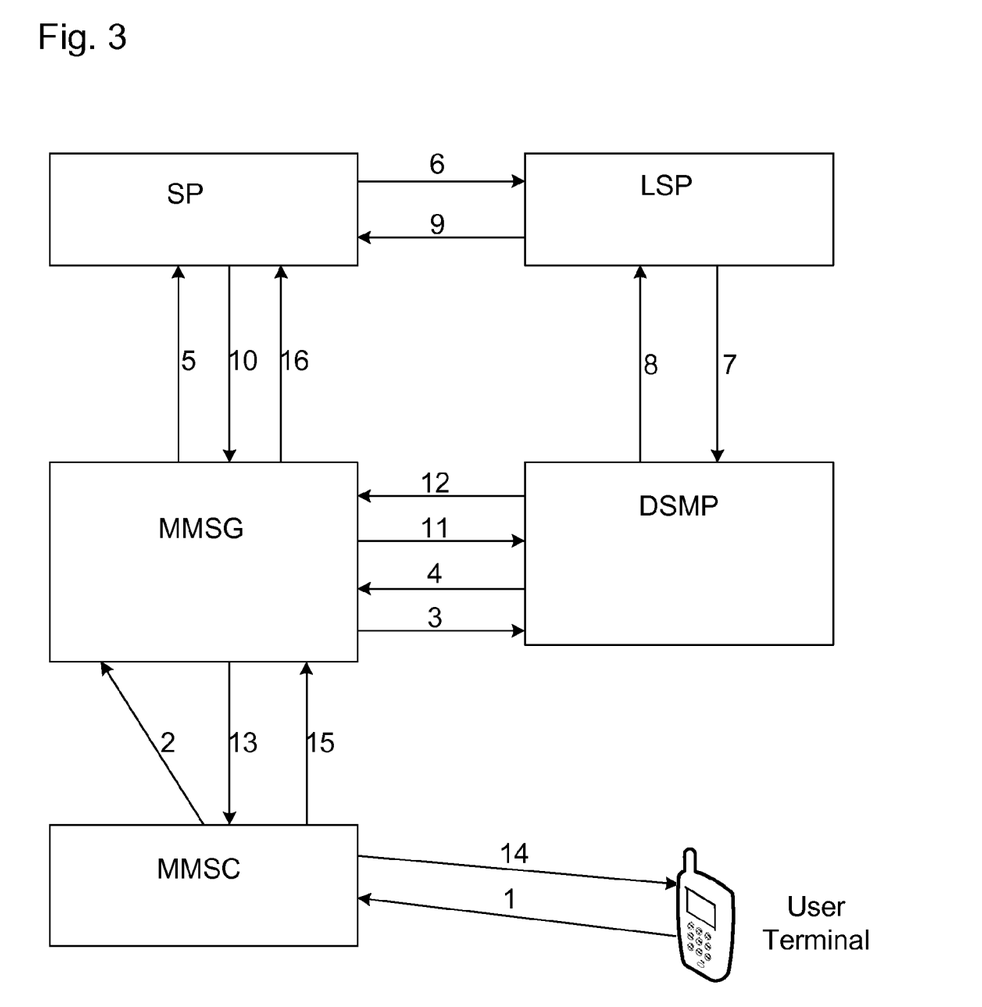
FIG. 3 is a schematic diagram illustrating the process of implementing the location service in the location service system according to one embedment of the present invention.

FIG. 3 is a schematic diagram illustrating the process of implementing the location service in the location service system according to one embedment of the present invention.

As shown in FIG. 3, during the realization of the present invention, the required improvements on the SP, LSP, MMSG, DSMP, and MMSC have been described in detail above, thereby needing no repeated explanations here. FIG. 3 further illustrates a process of message interaction between the net elements during the implementation of the location service, which will be described in detail with reference to FIG. 4.

Figure 4:
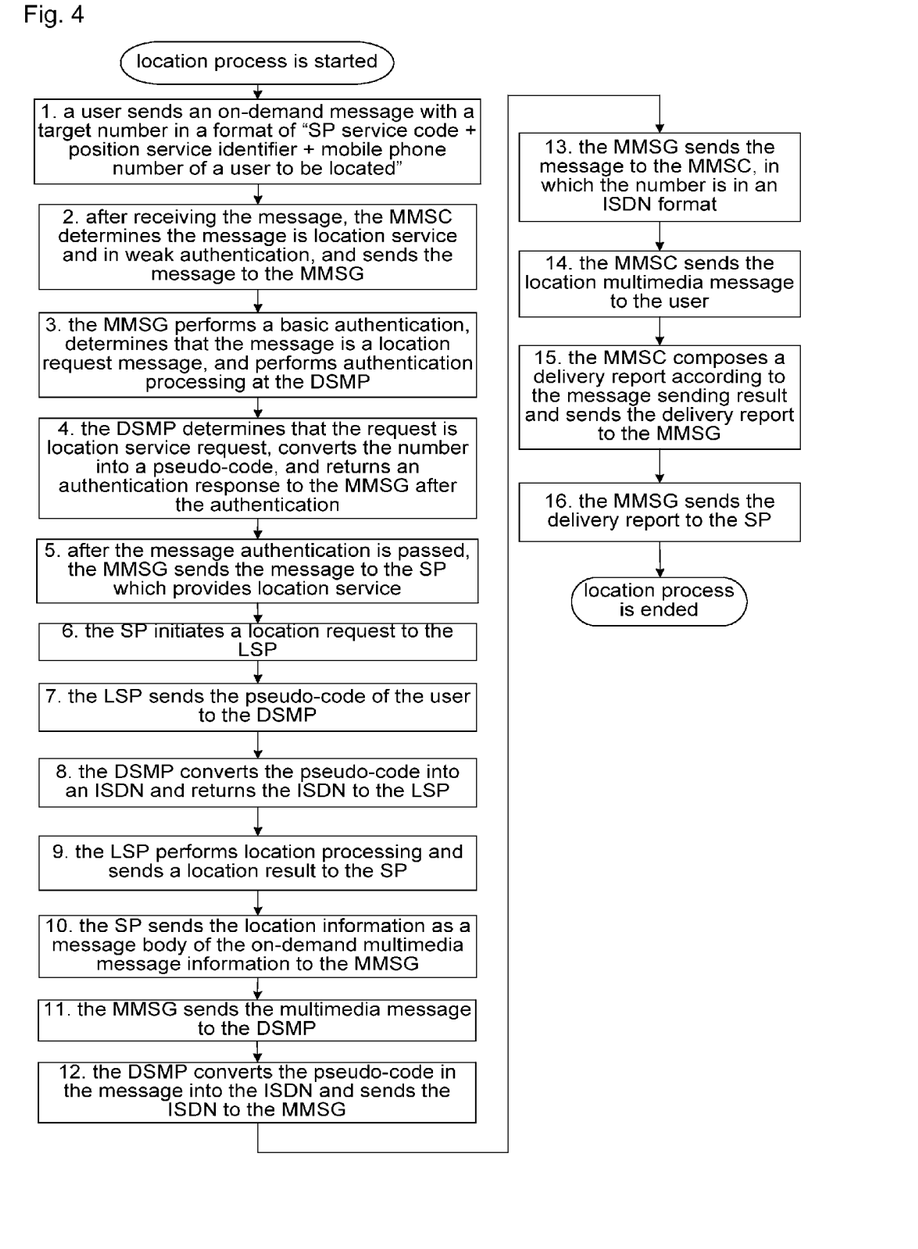
FIG. 4 is a flowchart illustrating the processing of implementing the location service in FIG. 3.

FIG. 4 is a flowchart illustrating the processing of implementing the location service in FIG. 3, in which, during the implementation of the location service, the specific process of message interaction is as follows that:

(1) a user sends an on-demand message (i.e. the location request message) with a target number in a format of "SP service code+position service identifier+mobile phone number of a user to be located";

(2) after receiving the message, the MMSC determines that the message is in weak authentication and forwards the message to the MMSG after the message is subjected to a simple authentication according to a configuration requirement (that is, after the location request message submitted by the user is received, the message is forwarded to the MMSG 2 only after the service code in the message is determined to be qualified, thereby avoiding that the MMSC 1 rejects the location service request message);

(3) the MMSG submits the multimedia message request to the DSMP, and the target number is unchanged, i.e. still in the format of "SP service code+position service identifier+mobile phone number of a user to be located";

(4) the DSMP identifies that this request is a location service request, replaces the field of the mobile phone number of the user to be located in the target number with a pseudo-code, and converts the number of the sender into a pseudo-code (a number obtained after encryption), that is to say, the number of the target user and the number of source user are encrypted and then the two numbers in the request message are replaced with the encrypted results respectively, and then the encrypted information is returned to the MMSG, preferably, MD5 is used as the encryption algorithm;

(5) the MMSG sends the request to the SP, and for the private transmission of the information, both the number of the sender (the number of the source user) and the number of the target user to be located are pseudo-codes;

(6) the SP initiates a location request to the LSP, wherein the request carries the pseudo-codes of both the number of the source user and the number of the target user; according to different values of the position service identifier (the value is used for identifying the mode of the location, i.e. locating the target user, or locating both the source user and the target user, and the format of the information needs to be provided after the location (an image and/or a text)), the user numbers sent by the SP may include a combination of the source user and target user to be located;

(7) the LSP extracts and transmits the pseudo-code of the user to be located (here the so-called user to be located refers to a combination of the source user and target user to be located in different cases) to the DSMP;

(8) the DSMP converts the pseudo-code of the user into an identifier of the Mobile Station (MS) (may be an Integrated Services Digital Network (ISDN) number of the user) and sends the identifier to the LSP;

(9) the LSP performs service authentication and user authentication, then performs the location after the authentication is passed, and sends a location result to the SP (the user number carried in the result is a pseudo-code);

(10) the SP sends the position information of the located user as a message body of the on-demand multimedia message information to the MMSG (the user number carried in the message is a pseudo-code), in which the multimedia message information body may vary depending on the position service identify set by the user, that is to say, the location result of the target user may be carried in the message, and furthermore, as well as the location result of the source user;

(11) the MMSG sends the on-demand multimedia message to the DSMP;

(12) the DSMP converts the pseudo-code in the on-demand multimedia message information body into the ISDN of the MS, and returns the converted multimedia message information to the MMSG;

(13) the MMSG sends the multimedia message which is subjected to the ISDN number replacement and returned by the DSMP to the MMSC;

(14) the MMSC sends the multimedia message information from the MMSG to the source user;

(15) the MMSC returns a delivery report to the MMSG; and (16) the MMSG forwards the delivery report to the SP, and the mobile phone number in the delivery report is preferably replaced with a pseudo-code.

It can be seen that, through the processing above, the location service is realized in the way of the MMS based on the merge of the current location service system with the multimedia messaging system, thereby effectively reducing the requirements of the location service on terminal capability and so on, and facilitating the development of the location service.

To sum up, with the technical solution of the present invention, the location service is realized in a way similar to the MMS by using the realizing mechanism of the MMS, merging the location system in the multimedia messaging system and modifying some interface messages and functions of system nodes, so as to not only reduce the requirement of the location service on terminal capability, but also more conveniently develop the location service, thereby realizing the aim of providing the convenient and efficient location service to users by using multimedia message information, avoiding the problem of failing to develop the location service due to various limits in the related art, and improving the user experience.

Obviously, those skilled in the art shall understand that the modules or steps of the present invention may be realized by a general computing device, or may be centralized in a signal computing device, or distributed in a network consisting of multiple computing devices. Optionally, the modules or steps may be realized by program codes executable by the computing device, so that they may be stored in a storage device and executed by the computing device, or respectively made into integrated circuit modules or a single integrated circuit module. By doing so, the present invention is not limited to any specific combination of hardware and software.

The above are only preferred embodiments of the present invention and not used for limiting the present invention. For those skilled in the art, the present invention may have various modifications and changes. Any modifications, equivalent replacements, improvements and the like within the principle of the present invention shall fall within the protection scope of the present invention.

What is claimed is:

1. A method for implementing location service, comprising:
    sending a location request message from a source user to a Multimedia Messaging Service Gateway (MMSG) by a Multimedia Messaging Service Center (MMSC);
    wherein the location request message comprises: an identifier of the multimedia message generating platform, a position service identifier, an identifier of the source user, and an identifier of a target user which the source user requests to locate;
    sending the location request message to a Data Service Management Platform (DSMP) by the MMSG;
    processing the identifier of the source user and/or the identifier of the target user according to a predetermined processing and returning a processed identifier of the source user and/or a processed identifier of the target user to the MMSG by the DSMP;
    sending the position service identifier and the processed identifier of the source user and/or the processed identifier of the target user to the multimedia message generating platform by the MMSG according to an identifier of the multimedia message generating platform;
    initiating a location request to a Location Service Platform (LSP) by the multimedia message generating platform according to the position service identifier and the processed identifier of the source user and/or the processed identifier of the target user;
    performing location according to the initiated location request and returning a location result to the multimedia message generating platform by the LSP;
    generating multimedia message information according to the location result and sending the multimedia message information to the MMSG by the multimedia message generating platform;
    sending the multimedia message information to the DSMP by the MMSG;
    determining the identifier of the source user according to the processed identifier of the source user, replacing the processed identifier of the source user in the multimedia message information with the determined identifier of the source user by the DSMP, and sending the replaced multimedia message information to the MMSC; and
    sending the replaced multimedia message information to the source user by the MMSC according to the identifier of the source user in the replaced multimedia message information.

2. The method according to claim 1, wherein the step of performing location by the LSP according to the initiated location request comprises:
    inquiring the identifier of the source user and/or the identifier of the target user of the DSMP by the LSP according to the processed identifier of the source user and/or the processed identifier of the target user;
    determining a service type of the location service by the LSP according to the position service identifier; and
    locating the target user or locating both the source user and the target user by the LSP according to the inquired identifier of the source user, the inquired identifier of the target user and the determined service type, thereby obtaining location information.

3. The method according to claim 2, wherein the step of inquiring the identifier of the source user and the identifier of the target user of the DSMP by the LSP according to the processed identifier of the source user and/or the processed identifier of the target user comprises: providing the identifier of the source user and the identifier of the target user by the DSMP according to an inverse transformation of the predetermined processing.

4. The method according to claim 2, wherein the step of performing location according to the initiated location request and sending the location result to the multimedia message generating platform by the LSP comprises:
    sending the location result which consists of the location information, the processed identifier of the source user and/or the processed identifier of the target user to the multimedia message generating platform by the LSP.

5. The method according to claim 4, wherein the step of generating the multimedia message information according to the location result and sending the multimedia message information to the MMSG by the multimedia message generating platform comprises:
    generating the multimedia message information according to the location information in the location result, and sending the processed identifier of the source user and/or the processed identifier of the target user to the MMSG through the generated multimedia message information by the multimedia message generating platform.

6. The method according to claim 1, wherein the processing the identifier of the source user and/or the identifier of the target user according to a predetermined processing comprises:
    encrypting the identifier of the source user and/or the identifier of the target user according to a predetermined processing.

7. A method for implementing location service, comprising:
    sending a location request message from a source user to a Multimedia Messaging Service Gateway (MMSG) by a Multimedia Messaging Service Center (MMSC);
    wherein the location request message comprises: an identifier of the multimedia message generating platform, a position service identifier, an identifier of the source user, and an identifier of a target user which the source user requests to locate;
    sending the location request message to a Data Service Management Platform (DSMP) by the MMSG;
    processing the identifier of the source user and/or the identifier of the target user according to a predetermined processing and returning a processed identifier of the source user and/or a processed identifier of the target user to the MMSG by the DSMP; and
    sending the position service identifier and the processed identifier of the source user and/or the processed identifier of the target user to the multimedia message generating platform by the MMSG according to an identifier of the multimedia message generating platform;
    initiating a location request to a Location Service Platform (LSP) by the multimedia message generating platform according to the position service identifier and the processed identifier of the source user and/or the processed identifier of the target user;

performing location according to the initiated location request and returning a location result to the multimedia message generating platform by the LSP;

generating multimedia message information according to the location result and sending the multimedia message information to the MMSG by the multimedia message generating platform;

sending the received multimedia message information to the source user through the MMSC by the MMSG.

8. A system for implementing location service, comprising: a Multimedia Messaging Service Center (MMSC), a Multimedia Messaging Service Gateway (MMSG), a multimedia message generating platform, a Location Service Platform (LSP), and a Data Service Management Platform (DSMP), wherein the MMSC is used for sending a location request message from a source user to the MMSG and sending the replaced multimedia message information from the MMSG to the source user; wherein the location request message comprises: an identifier of the multimedia message generating platform, a position service identifier, an identifier of the source user, and an identifier of a target user which the source user requests to locate;

the MMSG is used for sending the location request message from the MMSC to a Data Service Management Platform (DSMP); and sending the position service identifier and the processed identifier of the source user and/or the processed identifier of the target user to the multimedia message generating platform according to an identifier of the multimedia message generating platform; and sending the multimedia message information from the multimedia message generating platform to the DSMP;

the multimedia message generating platform is used for initiating a location request to the LSP according to the position service identifier and the processed identifier of the source user and/or the processed identifier of the target user, generating the multimedia message information according to a location result from the LSP and sending the generated multimedia message information to the MMSG;

the LSP is used for performing location according to the location request initiated by the multimedia message generating platform and returning the location result to the multimedia message generating platform; and the DSMP is used for receiving the location request message from the MMSG, processing the identifier of the source user and/or the identifier of the target user according to a predetermined processing, and sending the position service identifier, the processed identifier of the source user and/or the processed identifier of the target user to the multimedia message generating platform according to the identifier of the multimedia message generating platform through the MMSG; and receiving the multimedia message information, determining the identifier of the source user according to the processed identifier of the source user, replacing the processed identifier of the source user in the multimedia message information with the determined identifier of the source user, sending the replaced multimedia message information to the MMSC.

* * * * *

UNITED STATES PATENT AND TRADEMARK OFFICE
CERTIFICATE OF CORRECTION

PATENT NO. : 8,688,113 B2  Page 1 of 1
APPLICATION NO. : 13/258110
DATED : April 1, 2014
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 69 days.

Signed and Sealed this
Twenty-ninth Day of September, 2015

Michelle K. Lee
*Director of the United States Patent and Trademark Office*